(No Model.)

J. LACROIX.
ATTACHMENT FOR BAKING PANS.

No. 559,720.  Patented May 5, 1896.

WITNESSES
A. S. Pouncy.
B. W. McKlean

INVENTOR
Joseph Lacroix,
By his Atty
Henry Williams

UNITED STATES PATENT OFFICE.

JOSEPH LACROIX, OF FALL RIVER, MASSACHUSETTS, ASSIGNOR OF ONE-HALF TO FRANK ELMER SEARLL, OF PROVIDENCE, RHODE ISLAND.

ATTACHMENT FOR BAKING-PANS.

SPECIFICATION forming part of Letters Patent No. 559,720, dated May 5, 1896.

Application filed February 19, 1896. Serial No. 579,884. (No model.)

*To all whom it may concern:*

Be it known that I, JOSEPH LACROIX, a citizen of the United States, residing in Fall River, in the county of Bristol and State of Massachusetts, have invented a new and Improved Attachment for Baking-Pans, of which the following is a specification.

This is an attachment intended to be applied to baking-pans; and it consists of the novel construction hereinafter described whereby the meat which is to be cooked is suspended in a rotative frame adapted to be locked at different points, and elevated above the bottom of the pan, the object being to provide a simple means whereby the meat may be cooked evenly upon all sides and the juices held therein. Provision is also made for so dividing the rotative frame that more than one kind of meat can be cooked at the same time, and also for dropping the meat, after it has been cooked, out of the frame without touching it with the hands.

The nature of the invention in detail is fully described below and illustrated in the accompanying drawings, in which—

Figure 1:
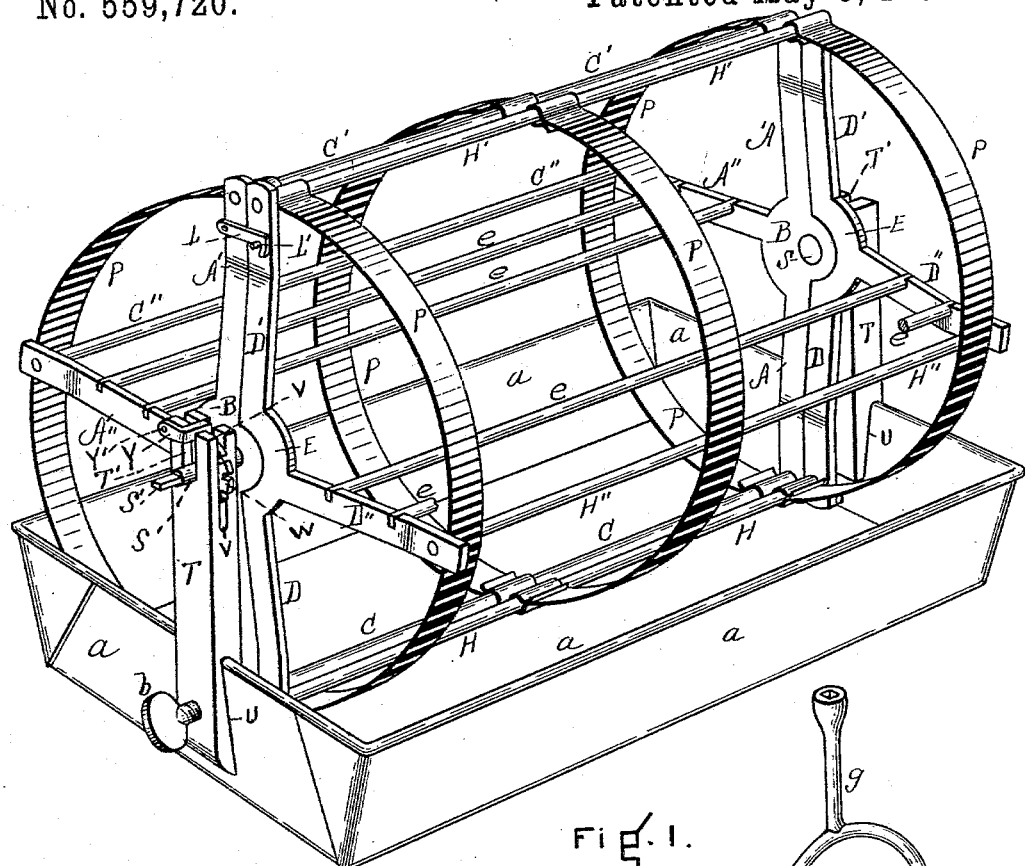
Figure 3:
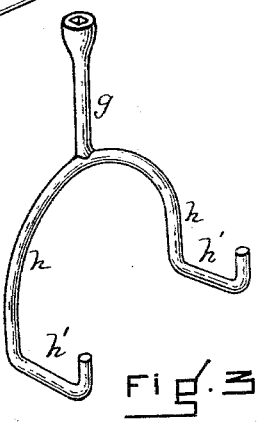
Figure 2:
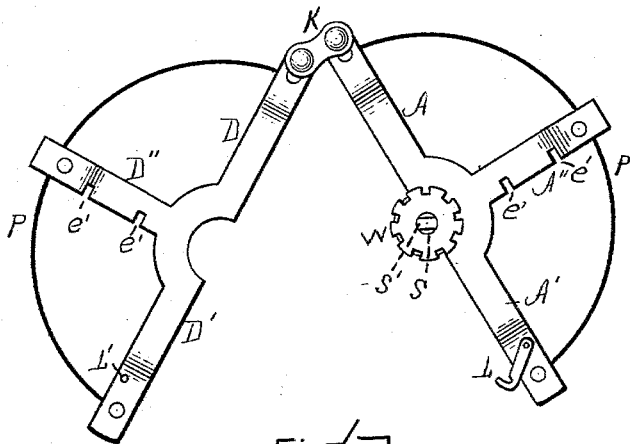

Figure 1 is a perspective view of my attachment applied to a baking-pan. Fig. 2 is an end elevation of the frame removed, reversed, and opened for the purpose of dropping out the contents, the rods forming the partition having been removed. Fig. 3 is a perspective view of a lifting-holder for raising the attachment out of the pan.

Similar letters of reference indicate corresponding parts.

A A' A" are three bars or spokes integral with and extending radially from the hub B. There are two duplicate sets of these spokes, each set radiating from a hub B, and these sets of spokes are connected by the horizontal rods C C' C". These duplicate spokes A A' A" and their connecting-rods C C' C" constitute one-half of the frame.

D D' D" are two sets of spokes radiating from the hubs E, each of said hubs fitting around a curved part of one of the hubs B. The spokes D D' are parallel with and next to the spokes A A', and the spokes D" are on a line with and extend oppositely from the spokes A". The two sets of spokes D D' D" are connected by the horizontal rods H H' H", and the outer ends of the spokes D are pivotally connected with the outer ends of the spokes A by means of the links K, thus hinging the two halves of the frame together. A latch L is pivoted to one of the spokes A' and is adapted to catch upon a pin L' on the adjacent spoke D', thus closing the two halves of the frame. Bands P extend from the rods H and C around the rods H" and C" to the rods H' and C'. Each band is made substantially in the shape of a half-circle, and as the bands on the one half of the frame are set opposite the bands on the other half the practical effect is produced of, say, three hoops or circular bands. From each of the hubs B there extends outwardly a horizontal supporting-rod S, one or both of which may be squared at the outer end, as at S', said rods lying in the vertical slots or bifurcations T', made in the upper ends of the standards T. These standards are bifurcated vertically at their lower ends at U, whereby they are enabled to rest on the opposite ends of the baking-pan *a*, being held immovably in such position by set-screws *b*. The upper end of one of the standards T is bifurcated at V at right angles with the bifurcation T', and a notched wheel W is fixed upon the shaft or pin S within said bifurcation V. A locking-bar Y is pivoted at Y' to one of the radial spokes A", and is bent so as to extend into the bifurcation T', and drops by gravity into one of the notches in the wheel W. Rods *e* extend longitudinally through the frame from the bars or spokes A" D" at one end to the corresponding spokes at the other end, the ends of said rods *e* resting in notches *e'*, Fig. 2. By this means the frame is divided into two equal parts or chambers. These bars *e* may, however, be omitted if desired.

In practical operation, the meat or fowl is placed within the frame, the latch L being first raised, and the two halves swung apart by means of the pivotal connections K to receive it. The frame is then closed and locked in the position indicated in Fig. 1, being prevented from rotation by the locking-bar Y. As the roasting process proceeds the locking-bar is lifted and the frame partially rotated and then locked by the latch dropping into another notch in the wheel W. This is continued at intervals until there have been one or more complete rotations, and the meat is cooked upon all sides. The rods $e$ may be used or not, as desired, but when they are used they are of advantage in allowing two different kinds of meat to be cooked in separate chambers within the same frame, such chambers being separated by the partition-rods $e$.

In order to prevent burning the hands, the frame may be lifted out of the standards T and away from the pan by catching the hooked portions $h'$ of the tool $h$ (illustrated in Fig. 3) under the rods C H. The portion $g$ may serve as a handle or may be employed to rotate the frame by being placed over the squared end $S'$ of the shaft S. When the tool has been caught under the rods C H, the frame can be reversed and opened by unhooking the latch L into the position indicated in Fig. 2, when the meat can be dropped into a suitable receptacle.

Having thus fully described my invention, what I claim, and desire to secure by Letters Patent, is—

1. The herein-described improved attachment for baking-pans, consisting of a frame comprising the two sets of radial spokes or bars A, A', A'' and hub B thereof; the longitudinal rods C, C', C'' connecting said sets of spokes; the two sets of radial spokes D, D', D'' and hub E thereof, and longitudinal bars H, H', H'' connecting said spokes; the bands P extending from the bars H, C over the bars H'', C'' to the bars H', C', said bars H, C being hinged together, and the opposite portion of the frame being adapted to be secured together by a latch or equivalent contrivance; spindles S extending horizontally outward from the hubs B; and supporting-standards adapted to receive said spindles and to be secured to the sides or ends of a baking-pan, substantially as described.

2. The herein-described improved attachment for baking-pans, consisting of a frame comprising the two sets of radial spokes or bars A, A', A'' and hub B thereof; the longitudinal rods C, C', C'' connecting said sets of spokes; the two sets of radial spokes D, D', D'' and hub E thereof, and longitudinal bars H, H', H'' connecting said spokes; the bands P extending from the bars H, C over the bars H'', C'' to the bars H', C', said bars H, C being hinged together, and the opposite portion of the frame being adapted to be secured together by a latch or equivalent contrivance; spindles S extending horizontally outward from the hubs B; the supporting-standards T bifurcated at their lower ends in order to embrace the sides or ends of a baking-pan, said standards being provided at their upper ends with the bifurcations T' whereby the spindles S are supported and one of said standards being further provided with the cross-bifurcation V; the notched wheel W fast on one of the spindles and extending into said bifurcation V; and a latch or locking-bar pivoted to the standard and adapted to extend normally into one of the notches in said wheel, substantially as set forth.

3. The herein-described improved attachment for baking-pans, consisting of a frame comprising the two sets of radial spokes or bars A, A', A'' and hub B thereof; the longitudinal rods C, C', C'' connecting said sets of spokes; the two sets of radial spokes D, D', D'' and hub E thereof, and longitudinal bars H, H', H'' connecting said spokes; the bands P extending from the bars H, C over the bars H'', C'' to the bars H', C', said bars H, C being hinged together, and the opposite portion of the frame being adapted to be secured together by a latch or equivalent contrivance; spindles S extending horizontally outward from the hubs B; the longitudinal partition-rods $e$ extending from one to the other of the radial bars D'' and from one to the other of the radial bars A''; and supporting-standards adapted to receive the spindles and to be secured to the ends or sides of a baking-pan, substantially as described.

JOSEPH LACROIX.

Witnesses:
 NICHOLAS HATHEWAY, Jr.,
 ARTHUR DESTREMPS.